Nov. 19, 1935.  A. E. RITSCHER  2,021,465
COOKING AND STEAMING UTENSIL
Filed May 11, 1934
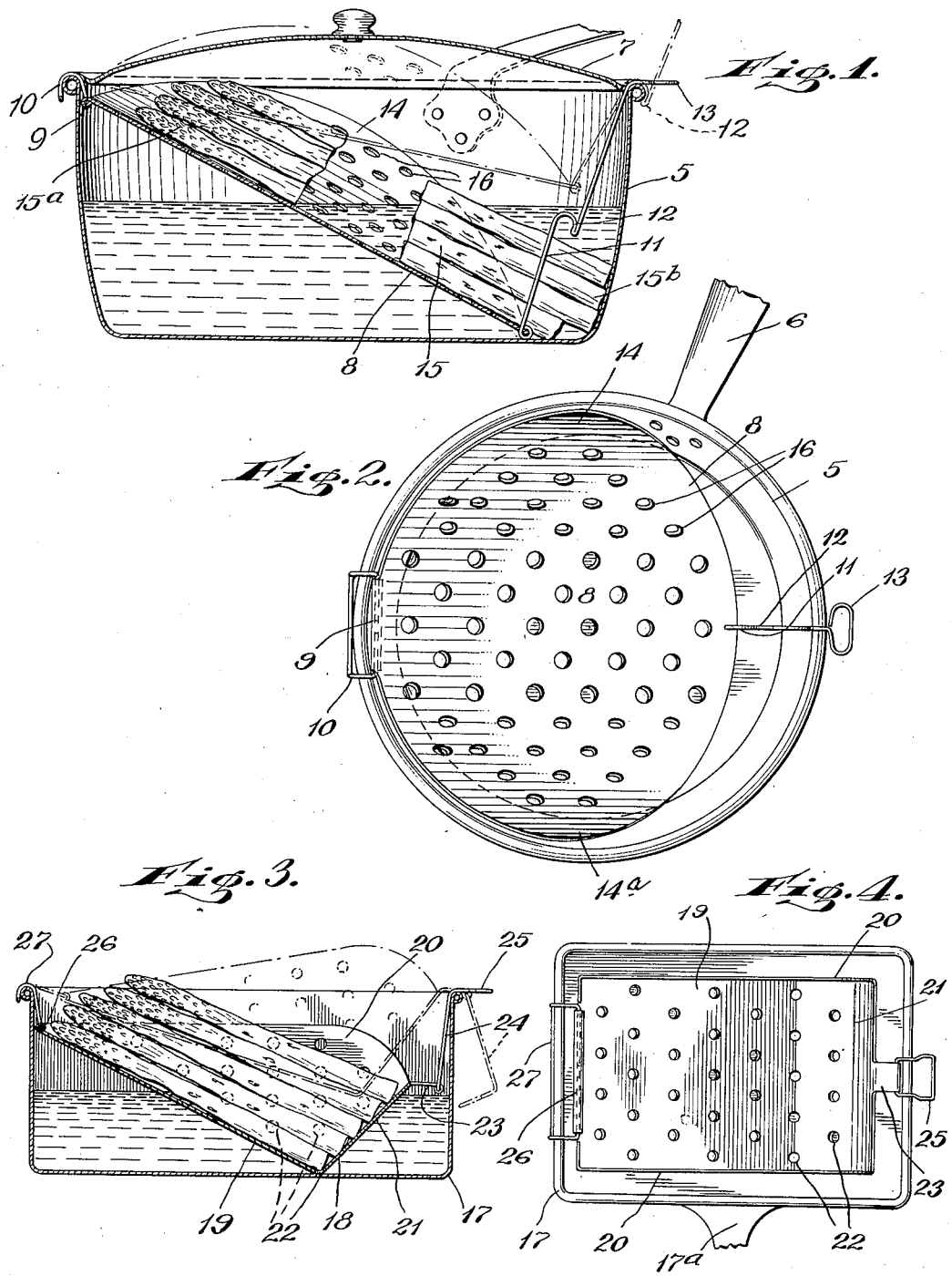
INVENTOR
Anna E. Ritscher
BY
ATTORNEY Patented Nov. 19, 1935

2,021,465

UNITED STATES PATENT OFFICE 2,021,465

COOKING AND STEAMING UTENSIL

Anna E. Ritscher, Glen Ridge, N. J.

Application May 11, 1934, Serial No. 725,125

9 Claims. (Cl. 53—2)

This invention relates to cooking utensils, and particularly to trays for cooking pots or pans; and the object of the invention is to provide a cooking pot or vessel with a tray mounted therein in such manner as to support predetermined products to be cooked or steamed in position against displacement in the cooking vessel as well as to maintain the shape and contour of such food products, facilitating the handling and serving thereof when cooked; a further object being to provide a tray device including side walls or flanges maintaining the food products against lateral displacement thereon and further, to the provision of a tray of the class specified wherein the body portion thereof is composed of openwork material, or in other words, a perforated sheet; a further object being to provide means for suspending the tray in connection with a cooking vessel, one of the means including a handle portion by means of which one end of the tray may be raised and lowered with respect to the vessel; and still further, to the provision of means for supporting said end of the tray in raised position to drain the food product when cooked prior to serving the same; a further object being to provide a supporting device or tray of the class described which is in the form of a scoop, the closed end of which serves to retain the food products against endwise displacement from the tray; a still further object being to provide an asparagus cooking utensil involving an elongated vessel with an elongated scoop-shaped tray detachably and movably supported in connection with said vessel; and with these and other objects in view, the invention consists in an article of manufacture of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a cooking vessel showing one form of tray or support which I employ, and indicating the manner of its use.

Fig. 2 is a plan view of the structure shown in Fig. 1 with the cover removed and omitting parts indicated in Fig. 1.

Fig. 3 is a view similar to Fig. 1 showing a modified form of construction and with the cover of the utensil removed; and, Fig. 4 is a plan view of the structure shown in Fig. 3 omitting the food products indicated in Fig. 3.

In Figs. 1 and 2 of the drawing, I have shown at 5 a cooking pot or vessel of the round or conventional shape having a handle portion 6 and a cover 7. At 8, I have shown one of my improved food product supporting trays or members, which as seen in Figs. 1 and 2 of the drawing, is in the form of a substantially circular or elliptical disk, one edge portion of which is fashioned to form a bearing 9 for receiving the ends of an elongated wire supporting loop or clip 10. An opposed edge of the tray 8 has a wire handle and supporting member 11 coupled therewith having an offset hook portion 12 therein.

The free end of the member 12 has an angularly disposed loop 13 forming a finger piece by means of which the tray may be raised and lowered with respect to the vessel and which, in conjunction with the member 10, will permit the movement of the complete tray from the vessel as will be apparent. Opposed side edges 14, 14a of the tray are curved or flared upwardly as viewed in Figs. 1 and 2 of the drawing so as to form side wall members which will retain asparagus or similar food products, indicated at 15, against lateral displacement with respect to the tray as the tray is raised or lowered in the vessel 5 and also in the handling of the tray when removed from the vessel.

The tray 8 consists of a sheet which has a plurality of perforations 16 therein to permit steam to pass therethrough and around the asparagus tips 15a to facilitate the proper cooking of the tender tip ends of the asparagus.

The tray 8 is mounted in the vessel in the manner illustrated in Fig. 1 of the drawing and the asparagus is placed thereon after the desired amount of water has been placed in the vessel so that the butt ends 15b of the asparagus are disposed at the bottom of the receptacle and the tip ends 15a upon the upper portion of the inclined tray as is indicated in Fig. 1 of the drawing.

The amount of water contained in the vessel may be varied to suit the particular type of asparagus or other food product being cooked or steamed by the use of my invention. However, in cooking asparagus by keeping the tip ends out of the water, the flavor of the asparagus is largely maintained, and no loss of the tender ends is affected by passage into the water in the vessel as is commonly experienced with conventional methods of preparing asparagus. This is one of the distinctive features of my invention which would also be applicable to other types of food products, such for example, as the cooking or steaming of Brussels sprouts, in which event, the particular manner of mounting the tray in the vessel as well as the structure of the tray would be varied to suit the product prepared.

In Figs. 3 and 4 of the drawing, I have shown a modification wherein a cooking pan or vessel of special design is employed, that is to say, an oblong, rectangular vessel 17. At 18, I have shown a tray of modified construction consisting of a bottom wall 19, side walls, flanges or wings 20 and an end wall 21 forming a substantially scoop-shaped supporting member, the walls of which are perforated as indicated at 22. The end wall 21 extends in the form of a tongue or hook member 23 which serves to support the tray in raised position as indicated in dotted lines in Fig. 3 of the drawing, and also as a means for coupling a handle member 24 therewith, the latter having an offset end 25 which extends beyond the vessel 17 to form a finger piece by means of which the tray may be raised and lowered in the vessel.

The other or open end of the scoop-shaped tray has a bearing 26 in connection with which is pivoted an elongated supporting loop 27 adapted to hook over the upper edge of one end of the vessel 17 to support said end of the tray in raised position as is clearly illustrated in Fig. 3 of the drawing. One long side wall of the vessel 17 includes a handle portion, part of which is indicated at 17a in Fig. 4 of the drawing, by means of which the vessel may be carried.

It will be apparent that the trays shown in the accompanying drawing are designed primarily for preparing asparagus. While I have shown certain structural features in the trays disclosed, my invention is not necessarily limited to the specific structure of the devices herein shown and described, and various other changes therein and modifications thereof may be made within the scope of the appended claims without departing from the spirit of my invention or sacrificing its advantages.

Having fully described my invention, what I claim as new and desire to secure by Letters Patent, is:

1. A cooking tray for supporting food products in predetermined position within a cooking vessel in the operation of cooking such products, said tray comprising a sheet of openwork material having upwardly extending side walls, means at one end of the tray adapted to support said end in raised position within a cooking vessel with the other end of the tray disposed adjacent the bottom wall of the vessel, said second named end of the tray having a projecting finger piece by means of which said end may be raised and lowered with respect to the vessel, means for supporting the last named end of the tray in connection with the vessel in raised position, and said last named end of the tray having an angularly disposed end wall.

2. A cooking utensil for supporting asparagus in predetermined position within a cooking vessel, said utensil comprising a sheet of metal apertured to form an openwork body, said body being in the form of a tray having upwardly extending side walls, means at the ends of the tray for supporting the same in an upwardly inclined position within a cooking vessel with one end portion of the tray disposed adjacent the bottom wall of the vessel whereby in placing asparagus on said tray, the lower or butt ends thereof will be disposed within a body of water placed in the vessel in the process of cooking the asparagus with the tip ends of said asparagus disposed above the water and at the top of the vessel.

3. A cooking utensil for supporting asparagus in predetermined position within a cooking vessel, said utensil comprising a sheet of metal apertured to form an openwork body, said body being in the form of a tray having upwardly extending side walls, means at the ends of the tray for supporting the same in an upwardly inclined position within a cooking vessel with one end portion of the tray disposed adjacent the bottom wall of the vessel whereby in placing asparagus on said tray, the lower or butt ends thereof will be disposed within a body of water placed in the vessel in the process of cooking the asparagus with the tip ends of said asparagus disposed above the water and at the top of the vessel, and the lower end portion of the tray including an upwardly extending perforated wall against which the lower butt ends of the asparagus are adapted to rest.

4. A cooking utensil of the class described comprising a sheet of metal perforated to form an openwork body throughout the entire area thereof, the side edges of said body being bent upwardly to form a scoop-like tray open at one end, and means at the ends of the tray for supporting said body in upwardly inclined position in connection with a suitable support with the open end of the tray extending forwardly.

5. A cooking utensil of the class described comprising a sheet of metal perforated to form an openwork body throughout the entire area thereof, the side edges of said body being bent upwardly to form a scoop-like tray open at one end, means at the ends of the tray for supporting said body in upwardly inclined position in connection with a suitable support with the open end of the tray extending forwardly, and the other end portion of said tray having an upwardly and outwardly extending perforated wall.

6. A cooking utensil of the class described comprising a sheet of metal perforated to form an openwork body throughout the entire area thereof, the side edges of said body being bent upwardly to form a scoop-like tray open at one end, means at the ends of the tray for supporting said body in upwardly inclined position in connection with a suitable support with the open end of the tray extending forwardly, the other end portion of said tray having an upwardly and outwardly extending perforated wall, and the side edges of the last named wall joining corresponding edges of said side walls.

7. A cooking utensil of the class described comprising a sheet of metal perforated to form an openwork body throughout the entire area thereof, said body having side walls bent upwardly to form a scoop-like tray open at one end, means at the ends of the tray for supporting said body in upwardly inclined position in connection with a suitable support with the open end of the tray extending forwardly, the other end portion of said tray having an upwardly and outwardly extending perforated wall, the side edges of the last named wall joining corresponding edges of said side walls, and said side walls being substantially triangular in form.

8. The combination with a cooking vessel, of means for supporting asparagus therein with the butt ends of the asparagus disposed adjacent and submerged in water at the bottom of the vessel and with the tip ends thereof adjacent the top of the vessel and above the water therein in the process of cooking asparagus, said means comprising a sheet of metal apertured to form an openwork body, said body having side walls bent upwardly to form a tray-like member, means at the end portions of said member for supporting the same in an upwardly inclined position within the vessel to support asparagus thereon within the vessel in the prescribed manner.

9. The combination with a cooking vessel, of means for supporting asparagus therein with the butt ends of the asparagus disposed adjacent and submerged in water at the bottom of the vessel and with the tip ends thereof adjacent the top of the vessel and above the water therein in the process of cooking asparagus, said means comprising a sheet of metal apertured to form an openwork body, the side walls of said body being bent upwardly to form a tray-like member, means at the end portions of said member for supporting the same in an upwardly inclined position within the vessel to support asparagus thereon within the vessel in the prescribed manner, and the lower end portion of said tray-like member having an angularly extending end wall upon which the butt ends of the asparagus placed thereon are adapted to abut.

ANNA E. RITSCHER.